US008565098B2

(12) United States Patent
Liu et al.

(10) Patent No.: US 8,565,098 B2
(45) Date of Patent: Oct. 22, 2013

(54) METHOD, DEVICE, AND SYSTEM FOR TRAFFIC SWITCHING IN MULTI-PROTOCOL LABEL SWITCHING TRAFFIC ENGINEERING

(75) Inventors: Jun Liu, Shenzhen (CN); Yanjun Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 493 days.

(21) Appl. No.: 12/763,351

(22) Filed: Apr. 20, 2010

(65) Prior Publication Data

US 2010/0202297 A1 Aug. 12, 2010

Related U.S. Application Data (63) Continuation of application No. PCT/CN2008/072805, filed on Oct. 23, 2008.

(30) Foreign Application Priority Data

Oct. 24, 2007 (CN) .......................... 2007 1 0182055

(51) Int. Cl.
*G06F 11/00* (2006.01)
*G08C 15/00* (2006.01)

(52) U.S. Cl.
USPC ............ 370/242; 370/244; 370/250; 370/252

(58) Field of Classification Search
USPC ........................................................ 370/242
See application file for complete search history.

(56) References Cited

U.S. PATENT DOCUMENTS

| 6,895,441 | B1* | 5/2005 | Shabtay et al. | 709/238 |
| 7,343,423 | B2* | 3/2008 | Goguen et al. | 709/239 |
| 7,370,119 | B2* | 5/2008 | Provine et al. | 709/239 |
| 7,675,848 | B2* | 3/2010 | Vasseur et al. | 370/216 |
| 7,804,767 | B1* | 9/2010 | Owens et al. | 370/217 |

(Continued)

FOREIGN PATENT DOCUMENTS

| CN | 1738288 A | 2/2006 |
| CN | 1929479 A | 3/2007 |

(Continued)

OTHER PUBLICATIONS

Ting Liao: "Fast reroute and its mechanism realization based on MPLS traffic engineering," Jan. 2007, 70 pages.

(Continued)

Primary Examiner — Ayaz Sheikh
Assistant Examiner — Blanche Wong
(74) Attorney, Agent, or Firm — Leydig, Voit & Mayer, Ltd.

(57) ABSTRACT

A method, device, and system for traffic switching in Multi-Protocol Label Switching Traffic Engineering (MPLS TE) are disclosed. The method includes: transmitting traffic over a standby Label Switching Path (LSP) after detecting fault of an active LSP; detecting that the forwarding entry on the active LSP is delivered completely after the fault of the active LSP is rectified; and switching the traffic to the active LSP, and transmitting the traffic over the active LSP. The present invention ensures that the forwarding entry on the active LSP is delivered completely, and prevents packet loss and traffic loss in the case of switching the traffic back from the standby LSP to the active LSP, thus improving the user experience and enhancing the network availability and stability.

10 Claims, 4 Drawing Sheets

(56) References Cited

U.S. PATENT DOCUMENTS

| | | |
|---|---|---|
| 2003/0046604 A1* | 3/2003 | Lau et al. .................... 714/11 |
| 2003/0137932 A1 | 7/2003 | Nishioka et al. |
| 2004/0193724 A1 | 9/2004 | Dziong et al. |
| 2007/0207591 A1* | 9/2007 | Rahman et al. ............ 438/439 |

FOREIGN PATENT DOCUMENTS

| | | |
|---|---|---|
| CN | 101035019 A | 9/2007 |
| CN | 101150587 A | 3/2008 |
| EP | 1912381 A1 | 4/2008 |
| JP | 2003087310 A | 3/2003 |
| WO | 2005039085 A2 | 4/2005 |
| WO | 2006017982 A1 | 2/2006 |
| WO | 2009056053 A1 | 5/2009 |

OTHER PUBLICATIONS

D. Awduche et al: "Requirements for Traffic Engineering Over MPLS," Sep. 1999, 22 pages.

Zhai Suping: "BFD Extensions for MPLS FEC mismatch detection," XP015039745, Mar. 2005, 7 pages.

European search report issued in corresponding European patent application No. 08843695.1, Jul. 23, 2010, 8 pages.

Written opinion issued in corresponding PCT application No. PCT/CN2008/072805, Feb. 5, 2009, 4 pages.

V. Sharma, Ed. et al.: "Framework for Multi-Protocol Label Switching (MPLS)-based Recovery", Feb. 2003, 30 pages.

Office action issued in corresponding European patent application No. 08843695.1, Dec. 7, 2010, 7 pages.

* cited by examiner

METHOD, DEVICE, AND SYSTEM FOR TRAFFIC SWITCHING IN MULTI-PROTOCOL LABEL SWITCHING TRAFFIC ENGINEERING

CROSS-REFERENCE TO RELATED APPLICATIONS

This application is a continuation of International Application No. PCT/CN2008/072805, filed on Oct. 23, 2008, which claims priority to Chinese Patent Application No. 200710182055.9, filed on Oct. 24, 2007, both of which are hereby incorporated by reference in their entireties.

FIELD OF THE INVENTION

The present invention relates to the routing and switching technologies on a communication network, and in particular, to a method, device, and system for traffic switching in Multi-Protocol Label Switching Traffic Engineering (MPLS TE).

BACKGROUND OF THE INVENTION

In recent years, the Internet and the Internet-based services have developed rapidly, which brings great business opportunities for Internet Service Providers (ISPs) and imposes higher requirements on the backbone network. The MPLS technology is put forward to solve a series of problems arising in more and more large networks.

As a key technology of new network, MPLS is a tunneling technology, and is a routing and switching technology that integrates label switching and forwarding with network-layer routing, and ensures security of information transmission to some extent. On the MPLS network, if packets are forwarded by using label switching, the network routes can be controlled flexibly. The label switching is widely applicable to traffic engineering, Virtual Private Network (VPN), and Quality of Service (QoS). The path for forwarding packets in the MPLS network is a Label Switching Path (LSP).

In an MPLS architecture, a control plane is connectionless and based on the existing Internet Protocol (IP) network; the forwarding plane (namely, the data plane) is connection-oriented and based on layer-2 networks such as frame relay or Asynchronous Transfer Mode (ATM) networks. On the data plane, MPLS encapsulates packets with labels which are short and have a fixed length, and forwarded quickly. On the control plane, powerful and flexible routing functions are provided like in an IP network, thus fulfilling various network requirements raised by new applications.

The MPLS technology has some features different from the Interior Gateway Protocol (IGP), and the features are required for Traffic Engineering (TE). For example, the explicit LSP routing is supported, and the LSP is easier to manage and maintain in contrast with the traditional IP packet forwarding; the Label Distribution Protocol (LDP) which is constraint-based routing can implement various policies of TE; and the overhead of device in MPLS-based TE is lower than the overhead in other implementing modes. Therefore, the MPLS technology is applied to TE massively. On the IP network, the MPLS TE technology is a main technology for managing network traffic, reducing congestion, and ensuring Quality of Service (QoS) of the IP network. Through the MPLS TE technology, an LSP tunnel of a specified path is set up to reserve resources so that the network traffic bypasses the congested node and is balanced. In the case that the resources are stringent, the bandwidth resources of LSP tunnel with a low priority is occupied to meet the requirements of high-bandwidth LSP tunnels or important services; and when the LSP tunnel is faulty or a network node is congested, protection is provided by using Fast ReRoute (FRR) and path backup.

Through the MPLS TE technology, the network administrator can eliminate network congestion by only setting up some LSP tunnels and bypassing the congested nodes. With the increase of the LSP tunnels, a special offline tool may be used to analyze the traffic. For more details about MPLS TE, see Request For Comments (RFC) 2702 "Requirements for Traffic Engineering Over MPLS".

In MPLS TE, the LSP which is set up based on certain constraint conditions is called a Constraint-based Routing LSP (CR-LSP). Unlike the setup of an ordinary LSP, the setup of a CR-LSP not only depends on routing information, but also needs to meet other conditions such as the specified bandwidth, selected path, or QoS parameters. During the network operation, traffic switching happens when the tunnel configuration is modified by the user, FRR switches, or the active LSP is faulty. Therefore, a standby LSP corresponding to the current active LSP needs to be set up under the same tunnel. The traffic is switched to the standby LSP when the ingress node perceives unavailability of the active LSP, and switched back upon recovery of the active LSP. In this way, the active LSP is protected with a standby mechanism.

Two standby modes are provided in the prior art: Hot-Standby (HSB) and ordinary standby.

The establishment of a standby CR-LSP accompanies the establishment of the active CR-LSP. When the active CR-LSP is faulty, the traffic is switched to the standby CR-LSP directly through MPLS TE, which is known as HSB.

After the active CR-LSP is faulty, a standby CR-LSP is established, which is known as ordinary standby.

The standby CR-LSP offers an end-to-end path protection for the whole LSP.

For the MPLS-TE HSB, the traffic is switched to the standby path and switched back to the active path through signaling convergence. When the fault of the active LSP is detected by using the signaling of the control plane, the traffic is switched to the standby LSP; after the recovery of the active LSP is detected by using the signaling, the traffic is switched from the standby LSP back to the active LSP.

However, the requirement for fast switching is not fulfilled in the foregoing process; that is, the fault of the active LSP is detected by using the signaling convergence of the control plane, and the switching result information is delivered to the forwarding plane, and then the forwarding plane performs traffic switching.

To improve the switching speed, a fast switching method is put forward in the prior art. In this method, the active LSP of TE is correlated with the Bidirectional Forwarding Detection (BFD) of the forwarding plane, and the fault of the active LSP is detected quickly by using the BFD, thus achieving fast switching.

Figure 1:
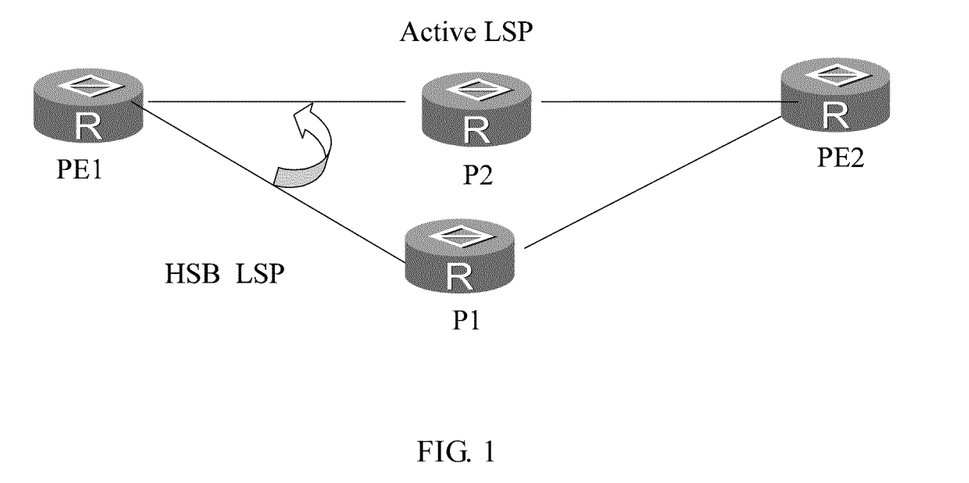
FIG. 1 is a schematic diagram of a fast switching system in the prior art.

FIG. 1 is a schematic diagram of a fast switching system in the prior art. As shown in FIG. 1, the system includes a Provider Edge router 1 (PE1), a PE2, a provider router (P1) and a P2. In HSB mode, a TE tunnel from the PE1 to the PE2 is set up. The active LSP passes through the P2; the standby LSP passes through the P1; and the active LSP is correlated with the BFD. On the control planes of PE1 and PE2, MPLS forwarding entries are created, including: Incoming Label Map (ILM), Next Hop Label Forwarding Entry (NHLFE), and Forwarding Equivalence Class-to-NHLFE Map (FTN). Such MPLS forwarding entries are delivered to the forwarding plane. On the control planes of P1 and P2, the MPLS forwarding entries "ILM" and "NHLFE" are created, and delivered to the forwarding planes of P1 and P2. The traffic runs over the active LSP through the P2 to the PE2, and is forwarded by the PE2.

When the PE1 perceives fault of the active LSP by using the BFD correlated with the active LSP, the traffic is switched to the standby LSP quickly on the forwarding plane. The traffic runs over the standby LSP through the P1 to the PE2, and is forwarded by the PE2.

When the PE1 perceives that the fault of the active LSP is rectified by using the signaling and the traffic needs to be switched back, the active LSP is set up again by using the signaling protocol of the control plane. An ILM and an NHLFE are delivered from the control plane to the forwarding plane, and the traffic is switched back to the active LSP. Currently, two modes for switching back are available: a mode for instantly switching back, and the other mode for switching back with delay.

In the mode for instantly switching back, the active LSP is set up again by using the signaling protocol of the control plane, and then is perceived by the PE1 by using the signaling. The ILM and NHLFE forwarding entries are delivered from the control plane to the forwarding plane in PE1 and an indication of directing the FTN to the active LSP NHLFE or an indication of setting the state of the active LSP to "up" is carried in the entries. The traffic is switched back to the active LSP in forwarding plane and sent to the P2. While the ILM and NHLFE forwarding entries are delivered to the forwarding plane in PE1, the ILM and NHLFE forwarding entries are delivered from the control plane to the forwarding plane in P2.

In the mode for switching back with delay, the active LSP is set up again by using the signaling protocol of the control plane, and then is perceived by the PE1 by using the signaling. The ILM and the NHLFE are delivered from the control plane to the forwarding plane in PE1. When the time setting for delay is out, the PE1 directs the FTN to the active LSP NHLFE, or sets the state of the active LSP to "up" through an indication. At this time, the traffic is switched back to the active LSP, and sent to the P2.

However, in the foregoing process, for the mode for instantly switching back, it is possible that the delivery of the ILM forwarding entries is not synchronous with the delivery of the NHLFE forwarding entries, which leads to traffic loss. For example, the delivery of the forwarding entries in PE1 is not synchronous with the delivery of the forwarding entries in P2, or the speed of the delivery is different. That is, if the forwarding entries are delivered more quickly in the PE1 than that in the P2, the traffic on the PE1 is switched back to the active LSP first. When the traffic of the PE1 arrives at the P2, the delivery of the forwarding entries is not complete in the P2 (for example, numerous route convergence is processed in the P2). In this case, the traffic loss occurs, which affects the availability and stability of the network drastically.

For the mode for switching back with delay, the traffic loss may be avoided through adjustment of the time for delay. However, it is hard to determine the time for delay. When the traffic is switched back, if the time for delay is set long, the switching back delay is also long, which affects the user experience and leads to a waste of network resources; if the time for delay is set short, the forwarding entries may not set up in the forwarding plane of P2 yet, which leads to traffic loss at the time of switching back, and affects the user experience and the network availability and stability.

SUMMARY OF THE INVENTION

Embodiments of the present invention provide a method, device, and system for traffic switching in MPLS TE to reduce the traffic loss at the time of back-switching.

A method for traffic switching in MPLS TE in an embodiment of the present invention includes:
transmitting traffic over a standby LSP after detecting fault of an active LSP;
detecting that the forwarding entry on the active LSP is delivered completely after the fault of the active LSP is rectified; and
switching traffic to the active LSP, and transmitting the traffic over the active LSP.

A network node device provided in an embodiment of the present invention includes:
a forwarding unit, configured to detect the state of delivering the forwarding entry on an active LSP, and switch the traffic back to the active LSP if determining that the forwarding entry on the active LSP is delivered completely.

A system for traffic switching in MPLS TE in an embodiment of the present invention includes: a PE1, a PE2, a P1, and a P2. The PE1 sets up an active LSP with the PE2 through the P2. The PE1 sets up a standby LSP with the PE2 through the P1. The PE1 is configured to detect the state of the active LSP, check whether the forwarding entry on the active LSP is delivered completely, and switch traffic back to the active LSP so that the traffic is transmitted over the active LSP.

The PE2 is configured to recover the active LSP with the PE1 by using the signaling of the control plane of PE1 after the active LSP is faulty.

The P2 is configured to set up the active LSP again by using the signaling of the control plane of PE1 after the active LSP is faulty, and to detect the state of the active LSP.

The P1 is configured to transmit traffic when the active LSP is faulty.

Through the method, device and system for traffic switching in MPLS TE in the embodiments of the present invention, after it is perceived that the active LSP recovers from faulty by using the signaling of the control plane, the BFD mechanism bound to the active LSP detects whether the forwarding entry is delivered completely. If completion of delivering the forwarding entry is detected, the traffic is switched back to the active LSP on the forwarding plane, thus ensuring that the forwarding entry on the active LSP is delivered completely. In this way, no packet and no traffic are lost at the time of switching the traffic back from the standby LSP. Therefore, the user experience is improved, and the network availability and stability are enhanced.

DETAILED DESCRIPTION OF THE INVENTION

To make the technical solution, objectives and merits of the present invention clearer, the following describes the present invention in detail with reference to accompanying drawings and exemplary embodiments.

In the embodiments of the present invention, through BFD binding, the state of the active LSP is detected the by using BFD over the active LSP after the active LSP is faulty. The traffic is switched back to the active LSP when it is detected that the state of the active LSP is "up".

A device for traffic switching in MPLS TE is provided in an embodiment of the present invention.

Figure 2:
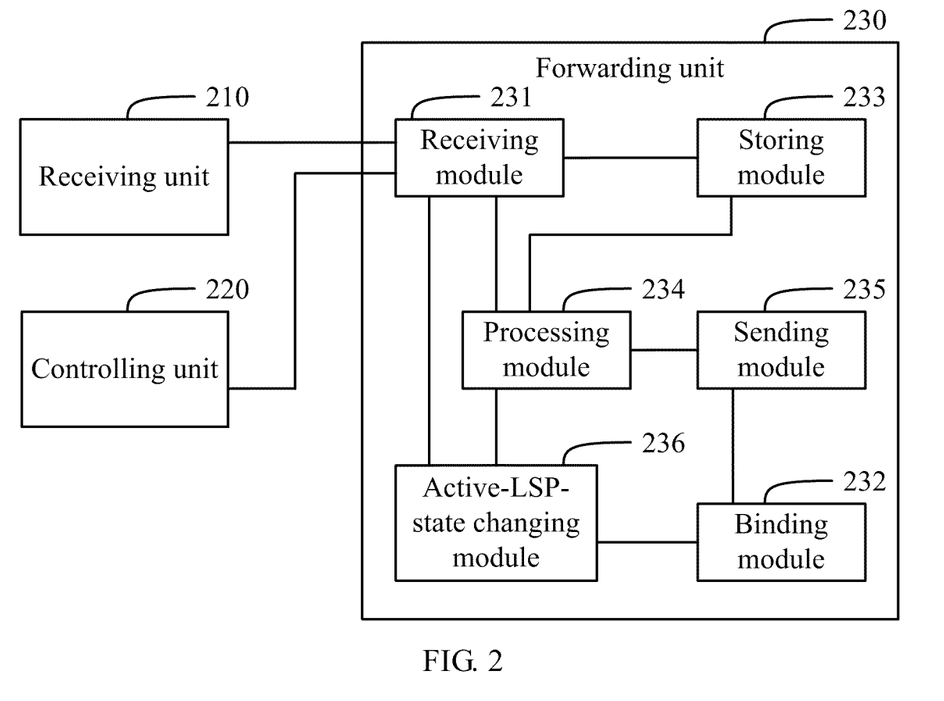
FIG. 2 is a schematic diagram of a device for traffic switching in MPLS TE in an embodiment of the present invention.

FIG. 2 is a schematic diagram of a device for traffic switching in MPLS TE in an embodiment of the present invention. As shown in FIG. 2, the device includes a receiving unit 210, a controlling unit 220, and a forwarding unit 230.

The receiving unit 210 is configured to receive a message about successful setup of an active LSP, and send the message to the controlling unit 220; receive a packet (traffic) and a BFD feedback message transmitted in the network, and send them to the forwarding unit 230.

The controlling unit 220 is configured to generate a forwarding entry according to the message about successful setup of the active LSP from the receiving unit 210, and deliver the forwarding entry, where information indicating that the active LSP is unavailable (down) is carried, to the forwarding unit 230.

The forwarding unit 230 is configured to configure a binding relationship between the BFD and the forwarding unit 230, receive the forwarding entry sent by the controlling unit 220, and set the state of the active LSP to "down" according to the received information indicating that the active LSP is unavailable; check the state of delivering the forwarding entry on the active LSP by using the BFD, and, if information about completion of delivering the forwarding entry is carried in the BFD feedback message sent by the receiving unit 210, set the state of the active LSP to "up", switch back the traffic, and forward the packet sent by the receiving unit 210 according to the forwarding entry.

The forwarding unit 230 includes a receiving module 231, a binding module 232, a storing module 233, a processing module 234, a sending module 235, and an active-LSP-state changing module 236.

The receiving module 231 is configured to receive the packet (traffic) and the BFD feedback message sent by the receiving unit 210, and send them to the processing module 234; receive the forwarding entry sent by the controlling unit 220, and send the forwarding entry to the storing module 233; and receive the information indicating that the active LSP is unavailable (down) sent by the controlling unit 220, and send the information indicating that the active LSP is unavailable (down) to the active-LSP-state changing module 236.

The binding module 232 is configured to bind the BFD and generate a BFD message which is designed for checking the state of the active LSP and sent to the sending module 235.

The storing module 233 is configured to receive the forwarding entry sent by the receiving module 231 and store the entries.

The processing module 234 is configured to receive the BFD feedback message; and, if the information about completion of delivering the forwarding entry is carried, send information about the "up" state of the active LSP to the active-LSP-state changing module 236, and switch back the traffic; receive the packet sent by the receiving module 235, and query the corresponding NHLFE from the storing module 233, and send the packet to the sending module 235.

The active-LSP-state changing module 236 is configured to receive the information indicating that the active LSP is unavailable (down) sent by the receiving module 231, and set the state of the active LSP to "down"; and receive the information about the "up" state of the active LSP from the processing module 234, and set the state of the active LSP to "up".

The sending module 235 is configured to receive the BFD message sent by the binding module 232 and the packet sent by the processing module 234, and send them out.

Figure 3:
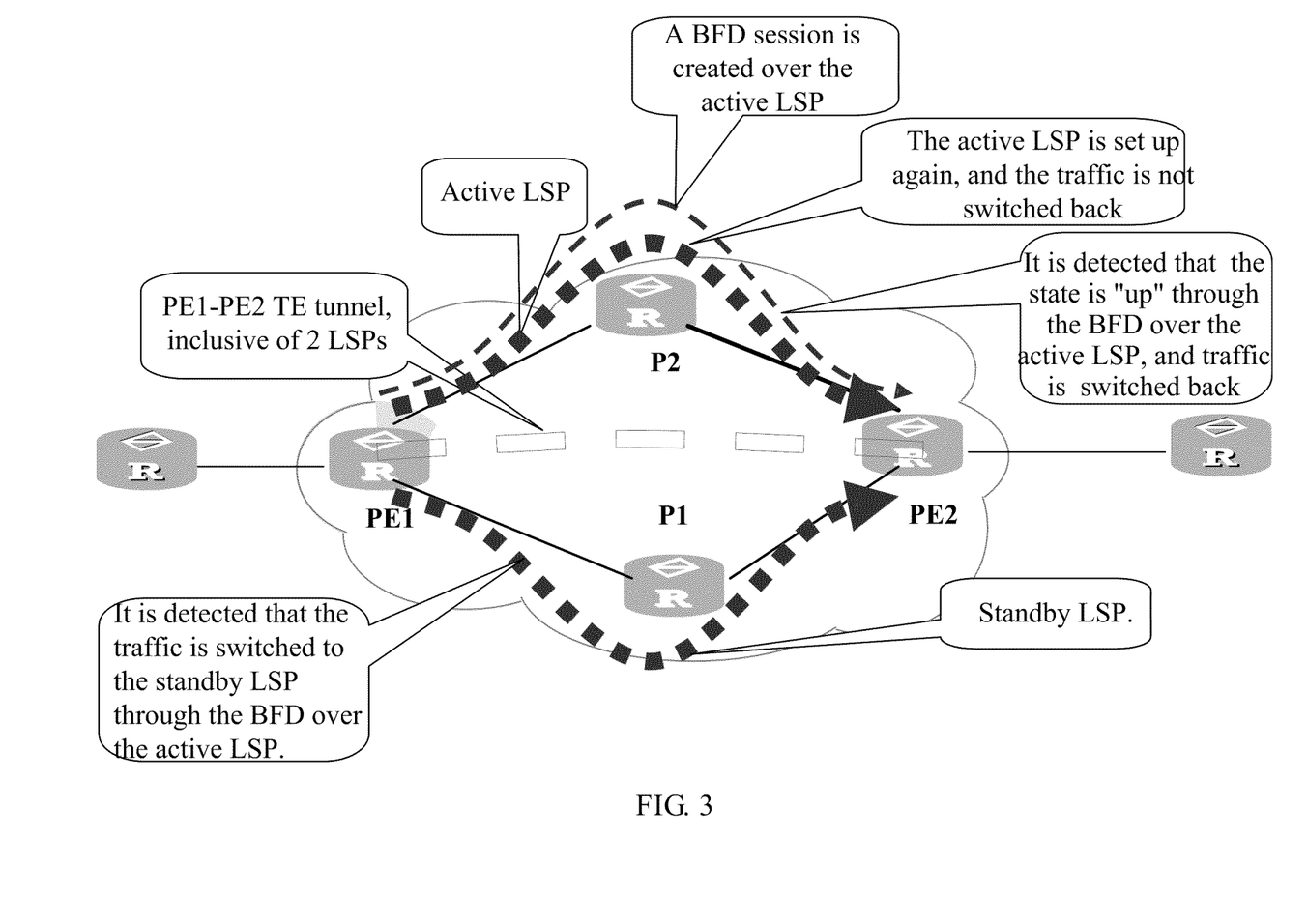
FIG. 3 is a schematic diagram of a system for traffic switching in MPLS TE in an embodiment of the present invention.

FIG. 3 is a schematic diagram of a system for traffic switching in MPLS TE in an embodiment of the present invention. As shown in FIG. 3, the system includes a PE1, a PE2, a P1, and a P2.

The PE1 is configured to configure a BFD binding relationship, set up an active LSP and a standby LSP with the PE2, and, if perceiving that the fault of the active LSP is rectified by using the signaling of the control plane, set up the active LSP again by using the signaling of the control plane, deliver the forwarding entry to the forwarding plane, and set the LSP state of the forwarding plane to "down"; create a BFD session over the active LSP on the forwarding plane, detect the state of the active LSP by using the BFD session, and, if detecting the information about completion of delivering the forwarding entry on the active LSP, switch the traffic back to the active LSP, and transmit the traffic over the active LSP.

The PE2 is configured to set up an active LSP with the PE1 through the P2, set up a standby LSP with the PE1 through the P1, and, after the active LSP is faulty, recover the active LSP with the PE1 by using the signaling of the control plane of PE1.

The P2 is configured to, after the fault occurs, set up the active LSP again by using the signaling of the control plane of PE1, deliver the forwarding entry to the forwarding plane, receive the BFD session sent by the forwarding plane of PE1, send the BFD session to the PE2, and detect the state of the active LSP.

The P1 is configured to set up a standby LSP between the PE1 and the PE2, and transmit the traffic when the active LSP is faulty.

Figure 4:
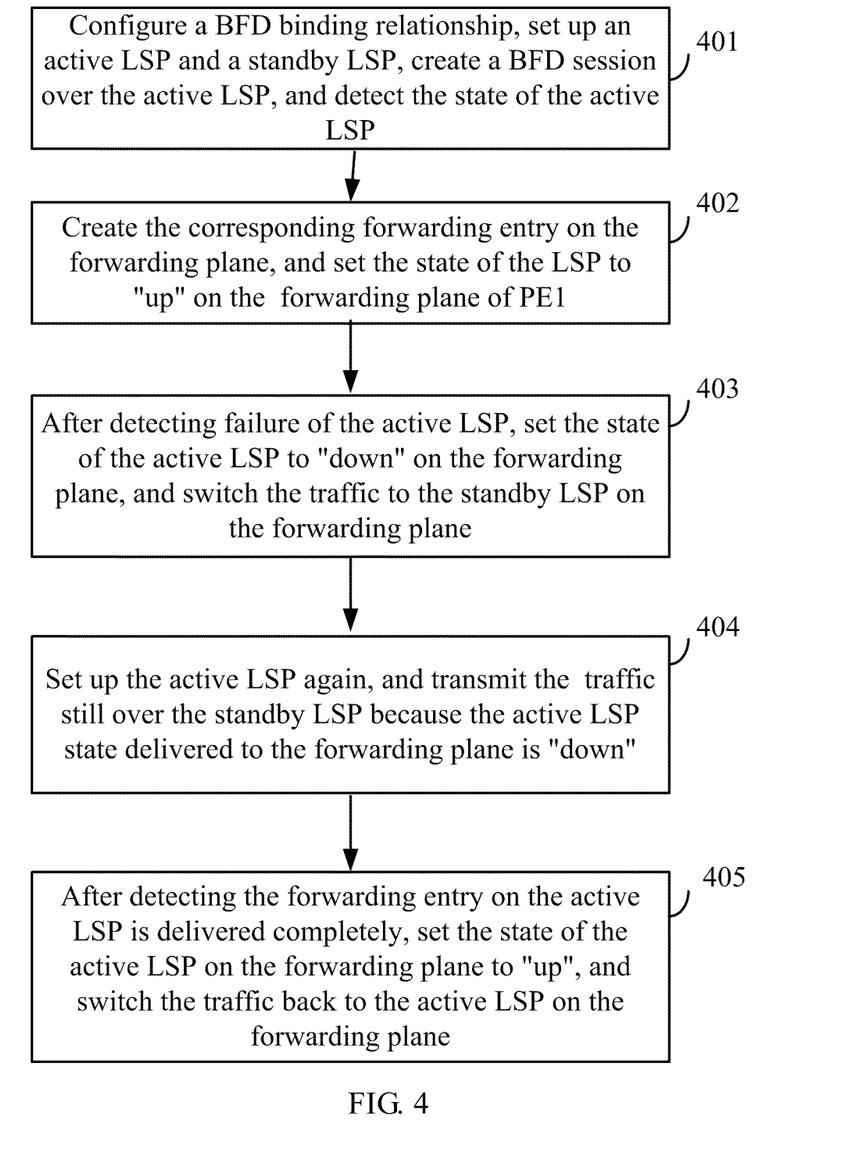
FIG. 4 is a flowchart of a method for traffic switching in MPLS TE in an embodiment of the present invention.

FIG. 4 is a flowchart of a method for traffic switching in MPLS TE in an embodiment of the present invention. As shown in FIG. 4, the method includes:

Block 401: A binding relationship between the BFD and the forwarding plane of PE1 is configured; an active LSP and a standby LSP are set up; and a BFD session is created over the active LSP on the forwarding plane. The state of the active LSP is detected by using the BFD session.

Block 402: The corresponding forwarding entry is created on the forwarding plane, and the state of the LSP is set to "up" on the forwarding plane of PE1.

For example, MPLS forwarding entries (including ILM, NHLFE, and FTN) are created on the control planes of PE1 and PE2; and the MPLS forwarding entries (including ILM and NHLFE) are created on the P1 and P2.

The MPLS forwarding entries (ILM, NHLFE, and FTN) on the control planes of PE1 and PE2 are delivered to the corresponding forwarding planes; and the MPLS forwarding entries (ILM and NHLFE) on the control planes of P1 and P2 are delivered to the corresponding forwarding planes. The forwarding planes receive and create the corresponding forwarding entries. The PE1 sets the state of the LSP to "up" on the forwarding plane, and the traffic runs over the active LSP through the P2 to the PE2, and is forwarded by the PE2.

Block 403: After the fault of the active LSP is detected by using the BFD, the state of the active LSP is set to "down" on the forwarding plane of PE1, and the traffic is switched to the standby LSP automatically on the forwarding plane.

For example, the PE1 perceives the fault of the active LSP on the forwarding plane by using the BFD, and sets the state of the active LSP to "down" on the forwarding plane. The traffic is switched to the standby LSP quickly, and the traffic runs over the standby LSP through the P1 to the PE2, and is forwarded by the PE2.

Block 404: After the active LSP is set up again, the state of the active LSP delivered by the PE1 to the forwarding plane is "down", and the traffic is still transmitted over the standby LSP.

For example, it is perceived by using the signaling of the control plane of PE1 that the fault is rectified. By using the signaling of the control plane, the active LSP is set up again, and the ILM and the NHLFE, where an indication of setting the state of the active LSP to "down" on the forwarding plane, are delivered to the forwarding plane. The traffic is transmitted still over the standby LSP, and at the same time, a BFD session is created over the active LSP again to detect the state of the active LSP.

Block 405: The state of the active LSP is detected by using the BFD. If it is detected that the forwarding entry on the active LSP is delivered completely, the state of the active LSP on the forwarding plane of PE1 is set to "up", and the traffic is switched back to the active LSP on the forwarding plane.

In practice, because transmission is bidirectional, when the data is transmitted from the PE2 to the PE1, a binding relationship between the BFD and the forwarding plane of PE2 is configured at the PE2. The state of the active LSP is detected by using the BFD session or by other means.

In the foregoing embodiments, the BFD is bound to the forwarding plane, and the state of the active LSP is detected by using the BFD session. After it is detected that the active LSP is faulty, the state of the active LSP of the forwarding plane is set to "down"; the traffic is switched to the standby LSP automatically on the forwarding plane, thus ensuring quick switching to the standby LSP when the active LSP is faulty; after it is perceived that the fault of the active LSP is rectified by using the signaling of the control plane, the state of the active LSP is set to "down" on the forwarding plane; a BFD session is created over the active LSP again to detect the state of the active LSP; the state of the active LSP is set to "up" and the traffic is switched back to the active LSP on the forwarding plane only if it is detected that the forwarding entry on the active LSP is delivered completely by using the BFD session, thus ensuring that the forwarding entry on the active LSP is delivered completely. Therefore, when the traffic is switched back from the standby LSP, no packet is lost, and no traffic is lost, thus improving the user experience. Because the state of the active LSP is detected in real time, the state of the active LSP is set to "up" and the traffic is switched back to the active LSP upon completion of delivering the forwarding entry, thus preventing the network resource waste or traffic loss caused by the delay time, improving the user experience, and enhancing the network availability and stability.

Detailed above are the objectives, technical solution and merits of the embodiments of the present invention. Although the invention has been described through several exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

What is claimed is:

1. A method for maintaining an active Label Switching Path (LSP) upon temporarily switching to a standby LSP by utilizing Bidirectional Forwarding Detection (BFD) in a Multi-Protocol Label Switching (MPLS) network, in which data traffic is transmitted based on MPLS forwarding entries, the MPLS forwarding entries are created on a control plane of a router in the MPLS network and delivered to a forwarding plane of the router;

the method comprising:
transmitting upstream data traffic over the active LSP based on MPLS forwarding entries of routers locating on the active LSP;
upon detecting a fault of the active LSP, switching the upstream data traffic to the standby LSP;
transmitting the upstream data traffic over the standby LSP based on MPLS forwarding entries of routers locating on the standby LSP;
creating a BFD session on forwarding planes of the routers locating on the active LSP to detect a current state of the active LSP;
after the fault of the active LSP is rectified, utilizing the BFD session for detecting that whether forwarding entries created on control planes of the routers locating on the active LSP are delivered completely to the forwarding planes of the routers locating on the active LSP; and
if the forwarding entries created on the control planes of the routers locating on the active LSP are delivered completely to the forwarding planes of the routers locating on the active LSP, switching the upstream data traffic back to the active LSP.

2. The method of claim 1, wherein before detecting that the forwarding entry on the active LSP is delivered completely, the method further comprises:
setting a state of the active LSP on a forwarding plane to be unavailable.

3. The method of claim 1, wherein before switching the traffic back to the active LSP, the method further comprises:
setting the state of the active LSP on the forwarding plane to be available.

4. A network node device, comprising:
a forwarding unit, configured to detect a state of delivering a forwarding entry on an active Label Switching Path (LSP), after a fault of the active LSP is rectified, utilize a Bidirectional Forwarding Detection (BFD) session for detecting that whether forwarding entries created on control planes of routers locating on the active LSP are delivered completely to forwarding planes of the routers locating on the active LSP, and switch traffic back to the active LSP if determining that the forwarding entry on the active LSP is delivered completely.

5. The device of claim 4, further comprising:
a receiving unit, configured to receive traffic and a Bidirectional Forwarding Detection (BFD) feedback message and send the traffic and the BFD feedback message to the forwarding unit.

6. The device of claim 5, further comprising:
a controlling unit, configured to generate the forwarding entry, and deliver the forwarding entry, where information indicating that the active LSP is unavailable is carried, to the forwarding unit.

7. The device of claim 6, wherein the forwarding unit comprises:
a receiving module, configured to receive the traffic and the BFD feedback message, and send the traffic and the BFD feedback message to a processing module; receive the forwarding entry sent by the controlling unit, and send the forwarding entry to a storing module; and receive the information indicating that the active LSP is unavailable sent by the controlling unit, and send the information indicating that the active LSP is unavailable to an Active-LSP-state changing module;

a binding module, configured to bind BFD, generate a BFD message which is used for checking a state of the active LSP and send the BFD message to a sending module;

the storing module, configured to receive the forwarding entry sent by the receiving module and store the forwarding entry;

the processing module, configured to receive the BFD feedback message; and, if an information about completion of delivering the forwarding entry is carried, send an information indicating that the active LSP is available to the Active-LSP-state changing module, and switch back the traffic; receive the traffic sent by the receiving module, query a corresponding forwarding entry from the storing module, and send the traffic to the sending module;

the Active-LSP-state changing module, configured to receive the information indicating that the active LSP is unavailable sent by the receiving module, and set the state of the active LSP to be unavailable; and receive the information indicating that the active LSP is available from the processing module, and set the state of the active LSP to be available; and the sending module, configured to receive the BFD message sent by the binding module and the traffic sent by the processing module, and send them out.

8. A system for traffic switching in Multi-Protocol Label Switching Traffic Engineering (MPLS TE), comprising:

a first provider edge router (PE1) configured to detect a state of an active Label Switching Path (LSP), check whether forwarding entry on the active LSP is delivered completely, and switch traffic back to the active LSP so that the traffic is transmitted over the active LSP;

a second provider edge router (PE2) configured to recover the active LSP with the PE1 by using signaling of a control plane of the PE1 after the active LSP is faulty;

a first provider router (P1) configured to transmit the traffic through a standby LSP when the active LSP is faulty;

a second provider router (P2) configured to set up the active LSP again by using the signaling of the control plane of the PE1 after the active LSP is faulty, and detect the state of the active LSP;

wherein the active LSP is between the PE1 and the PE2 through the P2, and the standby LSP is between the PE1 and the PE2 through the P1.

9. The system of claim 8, wherein:

the PE1 comprises a means for configuring a Bidirectional Forwarding Detection (BFD) binding relationship, create a BFD session over the active LSP on a forwarding plane, and detect the state of the active LSP by using the BFD session.

10. The system of claim 9, wherein:

the P2 comprises a means for receiving the BFD session sent by the forwarding plane of the PE1, and send the BFD session to the PE2.

* * * * *